United States Patent

Leming

[15] 3,670,583
[45] June 20, 1972

[54] LONG SPAN SCREW AND NUT DRIVES

[72] Inventor: John C. Leming, Glen Ellyn, Ill.

[73] Assignee: Overton Gear and Tool Corporation, Addison, Ill.

[22] Filed: Oct. 19, 1970

[21] Appl. No.: 81,996

[52] U.S. Cl.................................74/89.15, 74/441
[51] Int. Cl..........................................F16h 27/02
[58] Field of Search...........................74/89.15, 424.8 A, 441

[56] References Cited

UNITED STATES PATENTS

| 2,119,705 | 6/1938 | De Vlieg | 74/441 |
| 2,654,567 | 10/1953 | James | 74/424.8 A |
| 2,919,596 | 1/1960 | Kuehl | 74/424.8 A |
| 2,945,387 | 7/1960 | Geyer | 74/441 |

FOREIGN PATENTS OR APPLICATIONS

806,943   10/1936   France........................74/441

Primary Examiner—William F. O'Dea
Assistant Examiner—Wesley S. Ratliff, Jr.
Attorney—Hill, Sherman, Meroni, Gross & Simpson

[57] ABSTRACT

Relatively short coaxial, corotative screw sections are supported by brackets at such intervals as will assure adequate stiffness of the screw against deflection under the loads which it must withstand in service under conditions which a similar screw not supported intermediate its ends could not withstand without deflection. One or more transmission nuts are adapted to run along the screw, or the screw is adapted to run coaxially through the nut or nuts, with free relative passage of the nut and any supporting bracket along the screw. Heavy torque and thrust loads and relatively high speeds can be accommodated. Great practical adaptability and versatility are indicated.

29 Claims, 20 Drawing Figures

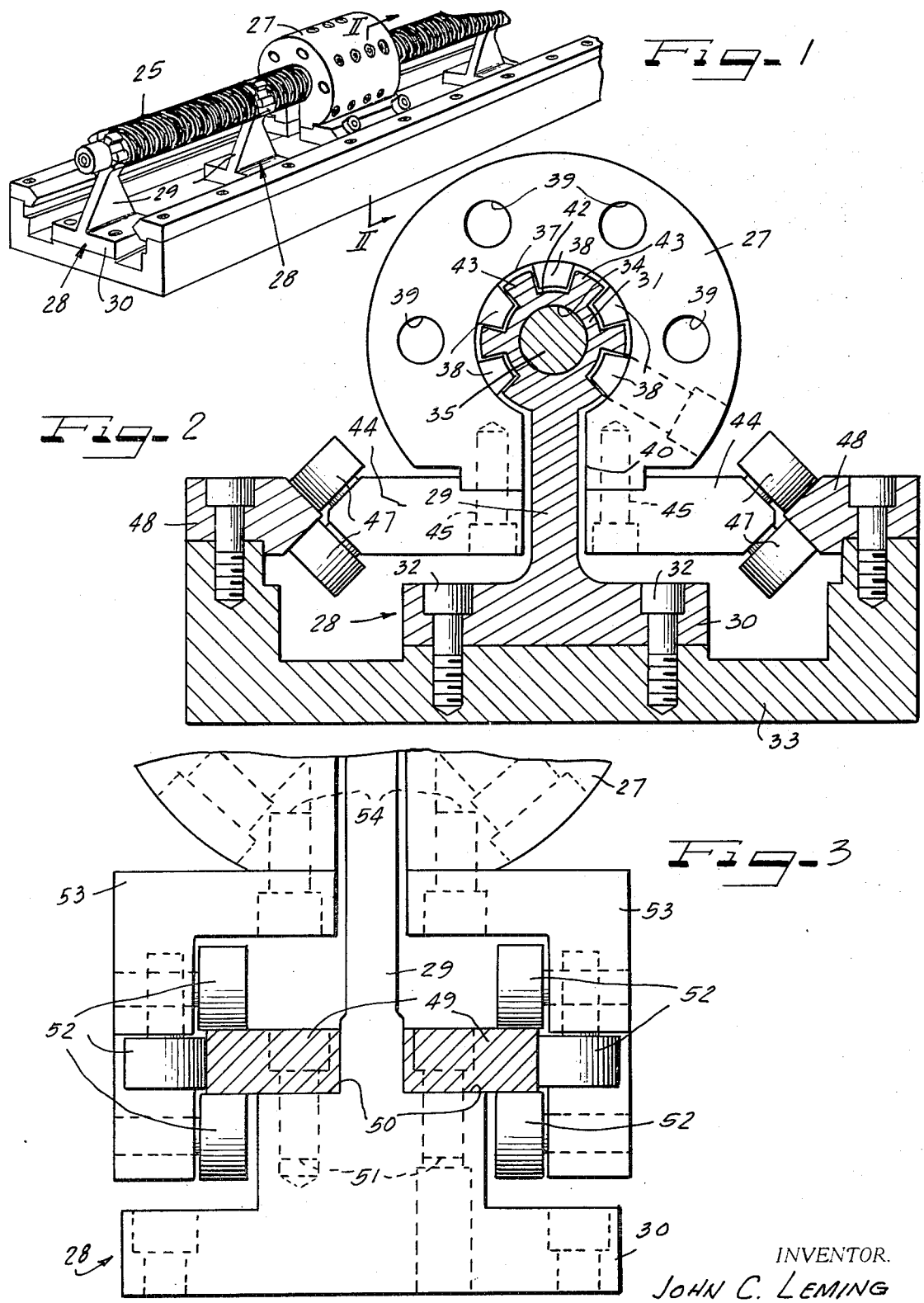

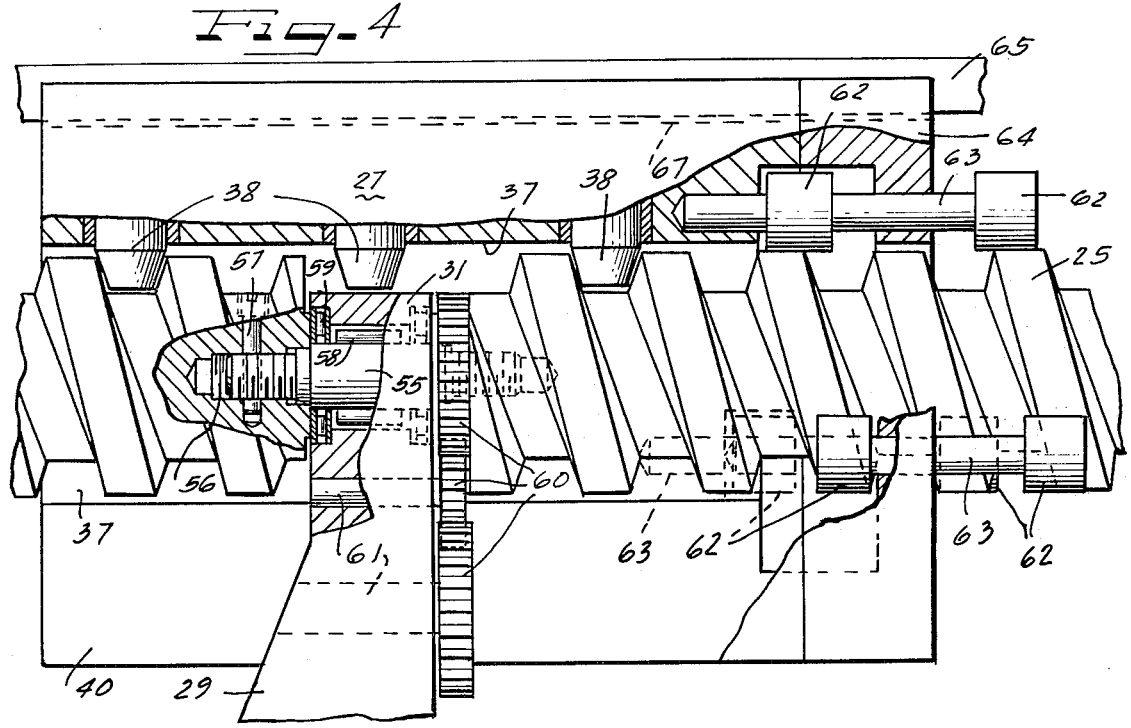

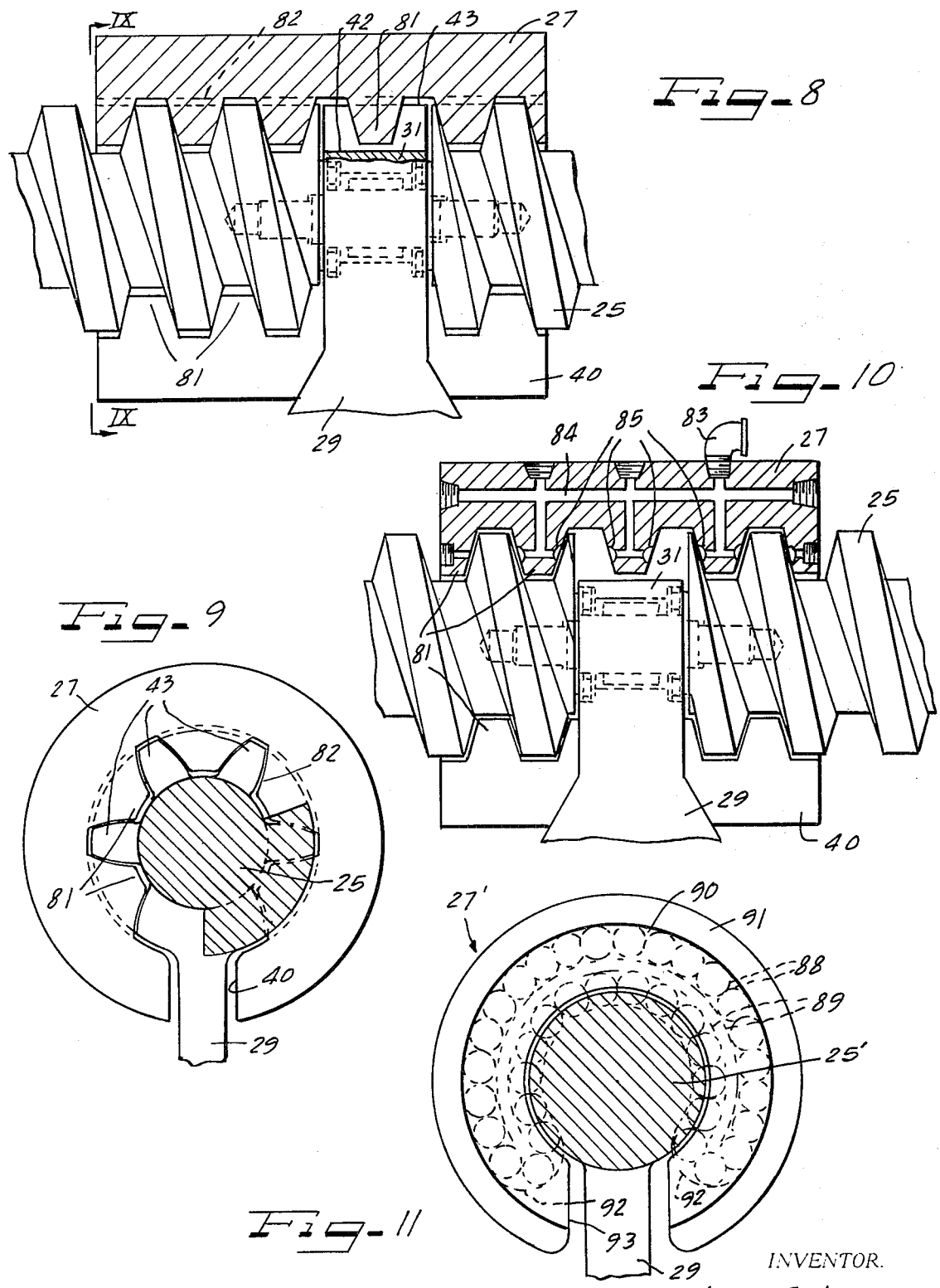

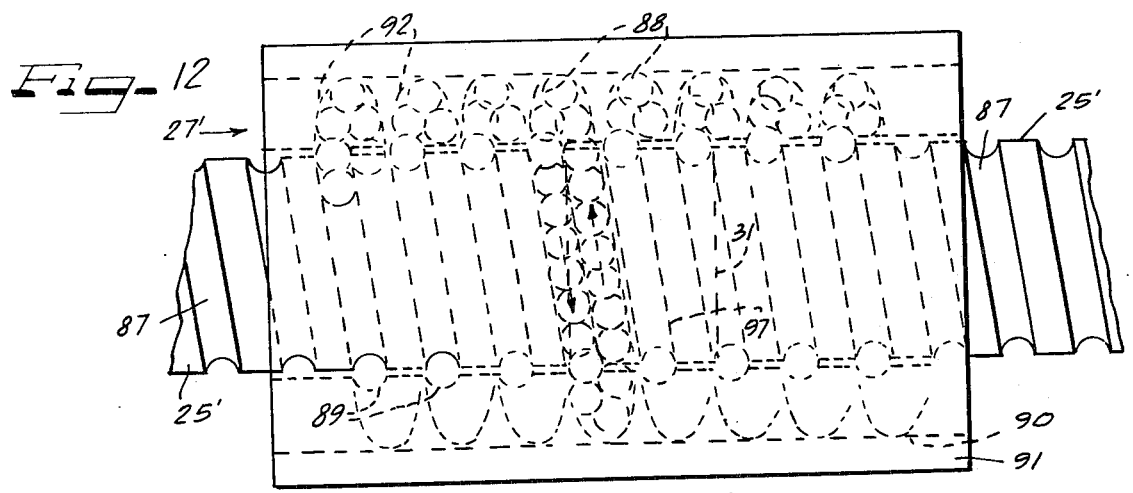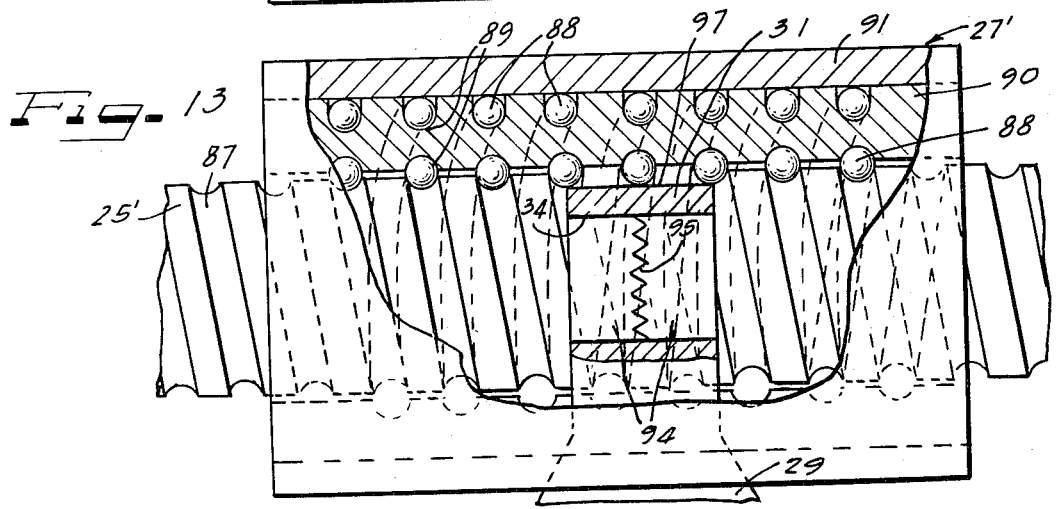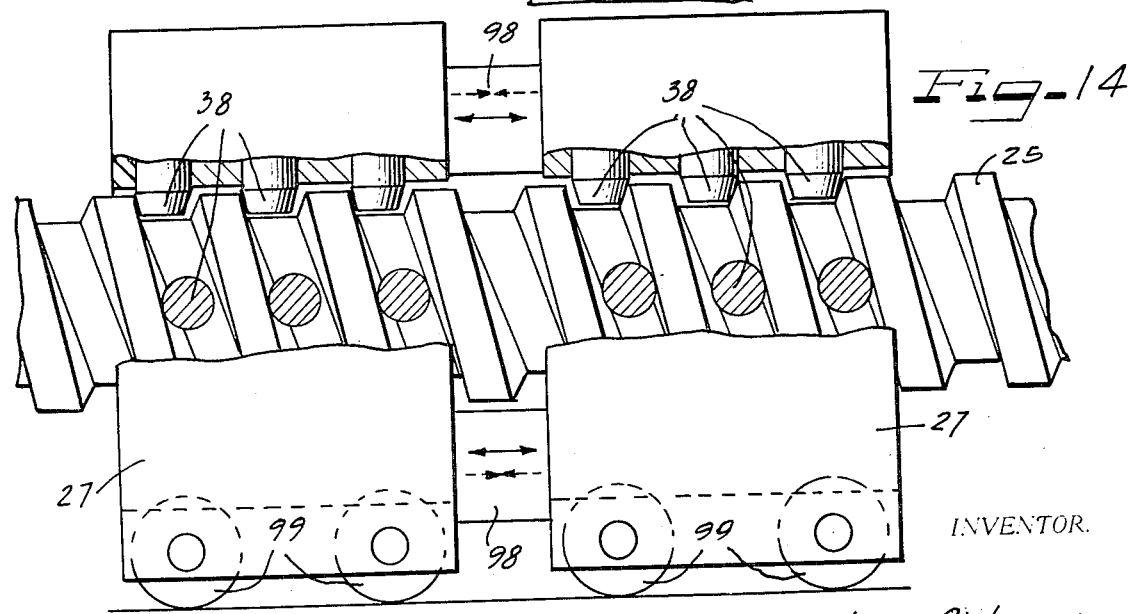

INVENTOR.
JOHN C. LEMING

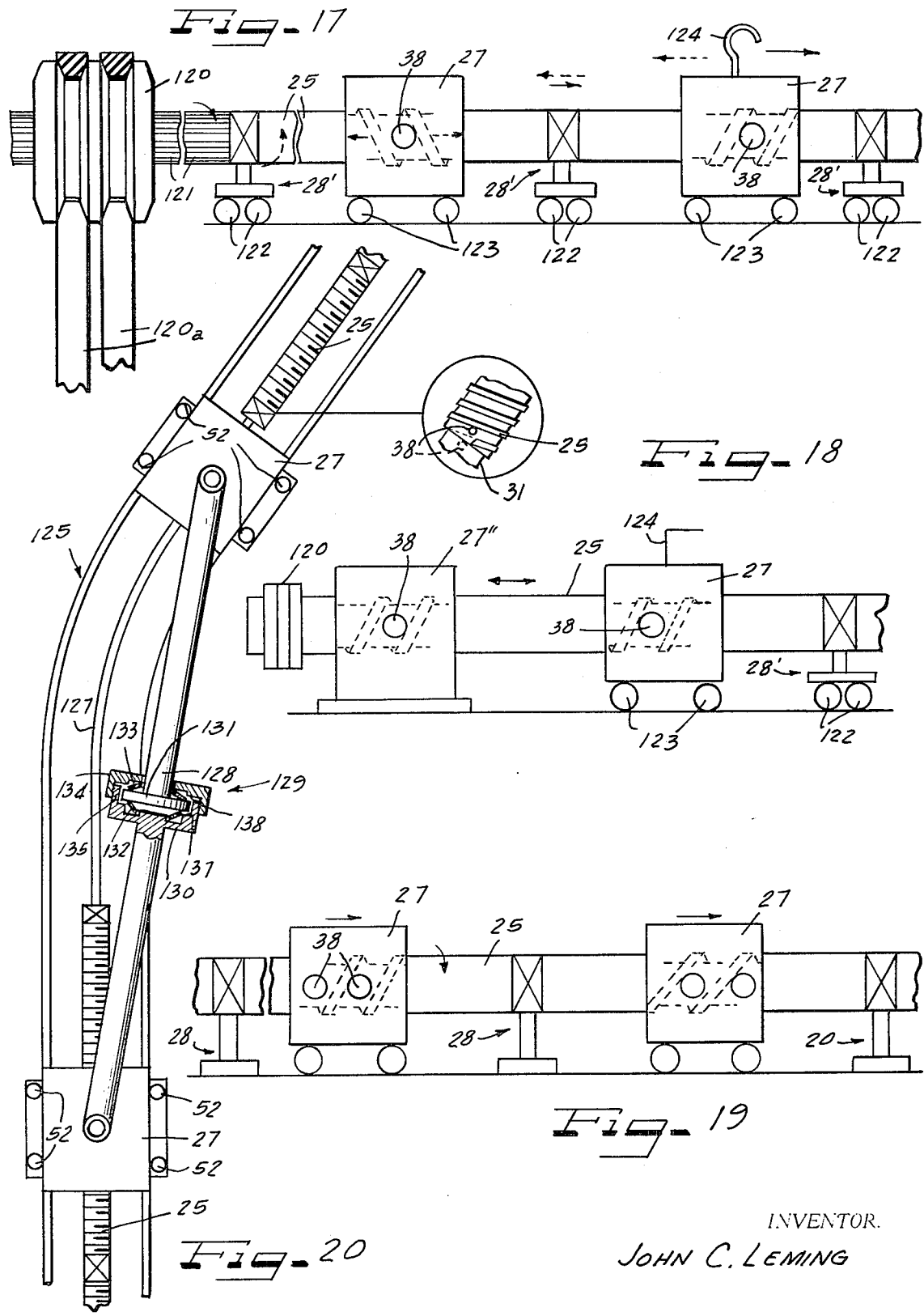

LONG SPAN SCREW AND NUT DRIVES

This invention relates to long span screw and nut drives and is more particularly concerned with making possible the use of longer screws than has heretofore been practical in screw and nut drives.

Long span screws have a tendency to buckle or catenary even when of large mass and diameter, and the more slender the screw the greater is the tendency to deflect laterally from the screw axis under load or pressure whether transverse or endwise. Heretofore this has presented severe limitations upon power, force or load transmissions employing screws and nuts wherein the nuts may travel along the screws or the screws may travel relative to the nuts depending upon the manner and purpose of the power transmission. Heretofore certain expedients have been proposed to circumvent the problem, such as providing separable hangers to pass the nut thereby as the nut travels along the screw, or by eliminating the nut altogether and substituting rack and pinion, cog wheel or other even less efficient forms of transmission. However, maximum power and low transmission with minimum effort is possible with a screw and nut mechanism.

It is, accordingly, a principal object of the present invention to overcome the foregoing and other disadvantages, defects, inefficiencies, shortcomings and problems in prior structures and to attain important advantages and improvements through the novel long span screw and nut drives exemplified hereinafter.

Another object of the invention is to provide a novel screw and nut drive wherein the screw will be free from distortion or sagging although long span and requiring that the screw travel uninterruptedly along the span.

A further object of the invention is to provide a new and improved long span screw and nut drive in which great resistance is afforded against interference or power loss from binding or uneven driving contact between the screw and nut.

Still another object of the invention is to provide novel means for steadying and operating a long span screw and nut drive.

A yet further object of the invention is to provide novel means for supporting a long span screw in a screw and nut drive.

Yet another object of the invention is to provide new and improved means for supporting a long span screw in non-interfering relation with relative travel of a nut along the screw.

A still further object of the invention is to provide new and improved means for eliminating backlash in a screw and nut drive.

It is also an object of the invention to provide a new and improved long span screw and nut drive of great versatility as to utility and to meet various power transmission requirements.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a fragmentary perspective view of a long span screw and nut structure embodying features of the invention;

FIG. 2 is an enlarged vertical sectional and elevational detail view taken substantially along the line II—II of FIG. 1;

FIG. 3 is a similar vertical sectional elevational detail view showing a modification;

FIG. 4 is a side elevational view, partially broken away and in section of a screw and nut drive showing another modification;

FIG. 5 is a fragmentary longitudinal sectional elevational view through a nut and screw assembly showing a further modification;

FIG. 6 is a transverse vertical sectional and elevational detail view showing a coupling arrangement between sections of the screw;

FIG. 7 is a fragmentary vertical transverse sectional view taken substantially along the line VII—VII of FIG. 6;

FIG. 8 is a fragmentary longitudinal vertical sectional elevational view through a still further modification showing a nut with an Acme thread;

FIG. 9 is a vertical transverse sectional elevational detail view taken substantially along the line IX—IX of FIG. 8;

FIG. 10 is a longitudinal vertical sectional elevational detail view showing a fluid cushion antifriction screw and nut drive;

FIG. 11 is a fragmentary vertical transverse sectional elevational view of a ball screw nut and screw drive;

FIG. 12 is a top plan view of the arrangement of FIG. 11;

FIG. 13 is a side elevational view, partially broken away and in section of the arrangement of FIGS. 11 and 12;

FIG. 14 is a fragmentary vertical sectional elevational schematic illustration of an anti-backlash arrangement of the nut and screw drive;

FIG. 17 is an illustrative fragmental schematic side elevational view illustrating an adaptability of the long span screw and nut drive of the present invention to attain fixed and variable travel ratios;

FIG. 18 illustrates another arrangement wherein a nut and screw are both linearly relatively movable;

FIG. 19 is a schematic illustration of the adaptability for differential travel of a plurality of nuts along a long span screw; and FIG. 20 is a top plan schematic view illustrating the adaptability of the principles of the present invention to an arrangement wherein the nut must travel an angular path with a long span screw assembly.

Figure 15:
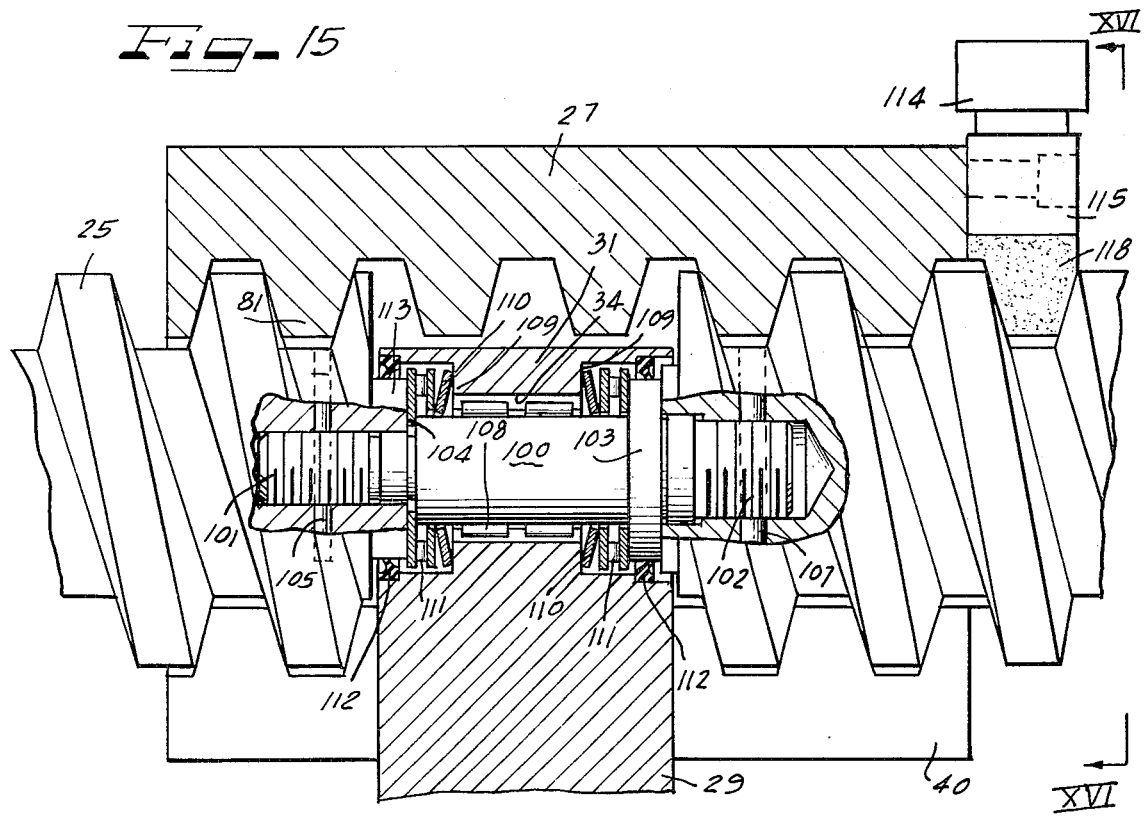
FIG. 15 is a fragmentary vertical longitudinal sectional elevational detail view showing another modification of the nut and screw drive.

According to the principles of the present invention, long span screw and nut drives capable of heavy torque and thrust loads, high speed operation, as well as great practical adaptability and versatility, are provided. Linear to rotary, rotary to linear, or combination rotary and linear motion transmissions or actuations are facilitated. High speed with low frictional forces is attained simply and economically. Virtually unlimited adaptability for direction or attitude of the screw and nut assembly is feasible, namely, horizontal with underneath support or hanging support, vertical, or any angular attitude between vertical and horizontal. In the following few representative examples, all of the respective screws are rotary in operation while the nuts are held non-rotatable relative to the associated screws, and each nut has a clearance slot to pass at least one or more intermediate screw-supporting brackets. Representative uses are in mechanism actuation, load movers, conveyors, elevators, motion transmission devices, drag rigs, transfer gear, and the like.

On reference to FIGS. 1 and 2, a rotary screw 25 has operatively mounted therewith a non-rotatably coactive nut 27 adapted to travel freely linearly along the screw. Although it is not intended to limit the type of screw thread, a desirable form is the square or Acme thread, especially where high torque and thrust load performance are required.

For maximum length of span in a screw structure which is of the smallest diameter and thus slenderness practicable for the intended useful application of the assembly, with complete assurance against bending, buckling, catenary effect, load-induced deflections, speed-induced whipping, or other interferences with smooth and reliable performance over an extended span of whatever length suitable for the particular service requirements to which put, the screw 25 is provided in relatively short sections which will conform to all of the performance criteria desired within the limitations of the short screw section length. Each screw section is thoroughly supported at each of its ends for stable concentric rotation by non-rotary supporting means desirably in the form of respective brackets 28. Each bracket comprises a spacer 29 rigid with a base 30 at one end and a screw-supporting head 31 at the opposite end. Preferably the base 30 is flanged to enable ready attachment as by means of screws 32 to supporting structure such as a beam or frame or runway 33 along which the brackets 28 are mounted in suitable spaced alignment.

In the form shown, the bracket head 31 has a central eye bore 34 receptive of a reduced diameter journal portion 35 of the associated end of the screw section or sections supported thereby. About the journal eye 34, the head 31 is of a diameter no greater than the screw thread crest diameter. In length, the bracket head 31 is sufficient, but no longer than necessary, to provide adequate journal support for the coaxial contiguous end portions of two corotatively coupled sections of the screw 25.

To receive the screw 25 and the bracket heads 31 therethrough, the body of the nut 27 is provided with a longitudinal clearance bore 37 into which project screw follower means such as studs 38 complementary to and adapted to ride in the thread grooves of the screw 25 and cooperative with the screw threads for relative motion transmission, i.e., linear motion transmitted to the nut 27 by rotation of the screw 25 driven in any suitable manner by any suitable power source, (not shown), or rotary motion imparted to the screw through the nut 27 by application of any suitable motivating or power source or means to the nut. The studs 38 may be of any suitable form, such as hardened pins mounted radially in the substantial mass body of the nut 27, anti-friction rollers, or the like. Means for attachment of the nut 27 to a connecting or coupling device such as a yoke, bar, arm, plate, or other member, of associated machinery, mechanism, apparatus, may include bolt or screw holes 39 at suitable places on or in the body of the nut 27, herein shown as extending into one end face, but which may extend in from either or both end faces of the nut, or may extend entirely therethrough, or may be provided where desired on the perimeter of the nut whether that perimeter is of the generally semi-cylindrical form shown or is of any other geometric shape desired.

To enable free passage of the nut 27 past the supporting brackets 28, while providing for maximum power transmission connection between the screw 25 and the nut, as narrow a bracket-clearance slot 40 is provided radially in and throughout the length of the body of the nut extending from the screw clearance bore 37 to the outer perimeter of the nut, complementary to the width of the spacers 29 which are in the form of as narrow as practicable webs in their transverse dimension but which may be of any desired width in the longitudinal direction of the screw. Thereby the nut 27 is adapted to be a rugged unit and each of the brackets 28 is adapted to be a rugged unit, with only inconsequential area of the nut bore 37 or screw follower structure of the nut interrupted by the clearance slot 40. Although the bracket head 31 may be of an outside diameter small enough to clear the followers 38, for maximum rigidity in the head, it may be desirable to have the construction as shown wherein the outside diameter of the head is merely of slightly smaller diameter than the diameter of the clearance bore 37 of the nut and has respective longitudinal grooves 42 therein through which the followers 38 can pass freely, since the nut is non-rotary but moves rectilinearly past the supporting bracket, with reinforcing ribs 43 on the head intervening between the grooves.

While the nut 27 may be held non-rotary relative to the screw 25 by the means attached to the nut for driving the nut or to be driven by the nut, as the case may be, a desirable arrangement supporting the nut relative to the screw in an efficient concentricity maintaining anti-friction manner comprises a trolley arrangement comprising trolley outrigger bars or plates 44 secured by means such as screws 45 to the body of the nut 27 along each side of the clearance slot 40, and carrying respective sets of anti-friction rollers 47 running on respective rails 48 carried by the supporting bar or beam 33. By having the rollers 47 in each set engaging with relatively oppositely facing surfaces of the rails 48, in this instance divergently gibway-like related track surfaces, great stability and fairly accurate guidance of the nut 27 in the concentric, anti-friction relation to the screw 25 is attained.

In FIG. 3 a modified guidance system for the nut 27 is depicted which may be preferred for some purposes as affording a more compact arrangement, and especially suitable for installations where it may not be feasible to mount tracks on other than the screw-supporting brackets. To this end, rail bars 49 of preferably rectangular cross section are mounted on respective shoulders 50 and secured thereto as by means of screws 51 at a suitable elevation above the attachment flanges of the bracket base 30. Thereby respective sets of anti-friction rollers 52 carried by angle brackets 53 secured as by means of screws 54 to the nut 27 are adapted to engage and run on the rails 49 in thoroughly stabilizing, concentricity-maintaining, nut-guiding relation. An advantage of the arrangement shown in FIG. 3, in addition to those already stated, is that the rollers 52 are protectively guarded by the depending roller-carrying portions of the roller-carrying flange members 53. It will be understood that the rails 49 extend continuously from bracket-to-bracket and may, if desired, be formed in sections connected in alignment, preferably at respective ones of or each of the supporting brackets 28.

FIG. 4 depicts several features that may be found desirable to meet various conditions. One such feature resides in the coupling means between the aligned contiguous ends of the adjacent sections of the screw 25. To this end, a double ended journal stud 55 has its opposite, threaded end portions threadedly secured into respective threaded axial bores 56 in the screw section ends, with respective locking pins 57 secured radially across the bores 56 and through the stud whereby to maintain the screw sections positively corotative and with the respective ends of the screw threads properly oriented i.e., maintaining constant lead alignment of the threads, with respect to the gap between the screw ends caused by the intervening bracket head 31 to enable unobstructed reception of the followers 38 by the threads upon leaving one of the screw sections and engaging with the other of the screw sections after travelling across the gap. It will be observed, of course, that the nut 27 is of sufficient length to assure stable engagement of at least one of the screw sections by a plurality of the followers 38 while the follower or followers 38 in the lead considered in the direction of movement of the nut relative to the screw pass across the bracket gap, and then while the intermediate follower or followers passes the gap, followers are in engagement with both of the screw sections at opposite sides of the gap. Anti-friction bearing means for the journal stud 55 may comprise roller bearings 58, while thrust bearings 59 are desirably provided between the respective ends of the screw sections and the bracket head 31 to assume end loads.

Another feature in FIG. 4 resides in means for boosting rotary torque of the screw 25 at suitable intervals therealong where load conditions, lengths of span, etc., might tend toward undue torsional stresses. Such intermediate rotary booster means may be of any suitable form, such as gearing 60 comprising a gear train drivingly connected with either the stud 55 or the end of one of the sections of the screw 25 and drivingly coupled with drive means clear of the nut which is constructed at the slot 40 to clear the gearing in passing thereby. Intermediate gears of the train 60 may be rotatably mounted on respective shafts 61 carried by the bracket fin 29.

An additional feature shown in FIG. 4 comprises a roller guide assembly for one or both ends of the nut 27 to facilitate passing over relatively large gaps between the travelling screw section ends and to retain the screw in relatively frictionless association with the travelling screw 25. In a desirable arrangement, the roller guide assembly comprises respective tandem pairs of small anti-friction rollers 62, with each pair carried on a shaft 63 carried by and where desired journalled in a roller-carrying end attachment 64 which may be suitably secured to the end of the body of the nut 27. Each of the rollers 62 in each pair is suitably spaced from the other to ride on the crest of the running screw thread substantially as shown, and with the respective pairs of the rollers relatively offset to effect such running although the sets of the rollers 62 are circumferentially spaced from one another, such as at three circumferentially spaced locations relative to the end of the nut body. While as illustrated the rollers 62 are shown as on axes parallel to the axis of the screw 25, they may be disposed with their axes normal to the pitch of the threads of the screw 25, if preferred. Use of the guide rollers 62 is desirable where it may not be feasible or desired to provide track guidance for the nut, even though a runner or trolley bar 65 received in a longitudinal peripheral track groove 67 in the nut may be provided to retain the nut against rotation relative to the screw 25.

As shown, especially in and with respect to FIGS. 2,3 and 4, but also in other Figures of the disclosure, the nut 27 is provided with means for supporting and guiding the nut body to travel along the screw in stabilized spaced substantially concentric friction-free relation and limiting direct contact between the nut and the screw to useful work engagement between the followers and the screw threads.

Various other means than already described may be employed in coupling the running screw sections together. For example, in FIG. 5 is shown an arrangement wherein the opposite ends of the screw sections are provided with complementary respective journal portions 68 provided with complementary confronting interlocking teeth 69 and journalled in the bracket eye 34. To draw the toothed journal end portions 68 firmly together in coaxial relation, a dumbbell coupler 70 is provided having opposite, threaded heads one of which is provided with fine threads and the other of which is provided with coarse threads respectively threadedly engaged within complementary threaded bores in the screw sections, and accessible for tightening through an axial access bore 71 in one or both of the screw sections.

In FIGS. 6 and 7 is shown an arrangement which is especially suitable for long span assemblies where it may be necessary or desirable from time-to-time to release one or more of the screw sections, or where it is not practical to assemble the sections end-to-end through fixed head eyes of the supporting brackets. For this purpose the bracket head comprises separable complementary parts including a journal receiving semicylindrical part 31' which is integral with the spacer web 29, and a separable complementary semi-cylindrical cap head part 31", with the head parts having complementary mating attachment flanges 72 adapted to be secured together as by means of screws 73. Within the journal eye 34 thus provided, complementary concentric reduced diameter journal end portions 74 on the adjacent ends of the running screw sections are coupled together by tongue and groove means comprising a coupling tongue 75 integral with one of the journal portions 74 fitting slidably in a transverse coupling groove 77 in the adjacent end of the other of the journal portions 74. Anti-friction roller bearings 78 about the journal portions 74 rotatably journal the journal portions in the eye 34, while respective thrust bearings 79 assume end load between a separable split ring spacer 80 and confronting spaced annular shoulders of the bracket head. The split spacer ring 80 maintains the adjacent journal portions 74 relatively free from end play. On reference to FIGS. 8 and 9, the nut 27 is shown as having the screw follower means in the form of square or Acme threads 81 complementary to and within which the threads of the screw 25 run for motion transmission. Although if preferred the reinforcing ribs 43 of the bracket head 31 may be omitted, where the head is provided with such ribs, longitudinal respective clearance grooves 82 are provided across the threads 81. For alleviation of excessive friction between the follower threads of the nut and the running screw threads, the screw threads or the nut threads or both may be formed from graphite filled bronze, excessive bearing areas of the threads may be reduced, lubricant pad areas may be provided within the nut, or other practical lubricating devices may be employed such as suitable lubricator means mounted on the nut.

In FIG. 10 is depicted a completely friction-free square thread driving connection between the screw 25 and the nut 27, utilizing a fluid cushion between the cooperating threads. For this purpose, lubricating fluid, either liquid or gas, is introduced from a suitable source through an inlet 83 into a drilled or cored distributor passage system 84 having substantially equalized discharge ports 85 appropriately located on the side faces of the nut threads 81. Through this means, the screw and nut threads are maintained in spaced substantially frictionless floating equilibrium by the lubricating dynamic fluid introduced under pressure between the threads.

Another driving connection between the nut and screw providing substantially frictionless driving thrust is depicted in FIGS. 11–13 wherein the screw 25' has half round spiral thread grooves 87 therein, and the nut 27' carries anti-friction follower balls 88 riding in the screw grooves 87 and running in closed circuit on and in respective orbital track grooves 89 provided in a nut body core member 90 carrying thereabout an enclosing complementary coextensive jacket sleeve 91. As will be observed, each of the orbital groove tracks 89 has an active follower run on the inner perimeter of the body 90 complementary in pitch to the pitch of the spiral thread groove 87 of the running screw 25'. Escape of the anti-friction follower balls 88 from between the screw and the body 90 is precluded by the uniform narrow clearance space therebetween which is, as clearly evidenced in FIGS. 11 and 13, only a small fraction of the diameter of the balls. This narrow spacing also facilitates movement of the balls across the gap between the thread groove 87 and respective arcuate transition guide surfaces in the body 90 at the respective opposite ends of each of the return run sections of the ball orbit grooves 89 located in the outer perimeter of the body 90 and closed by the jacket 91. These arcuate groove end portions 92 are located as close as practicable to a longitudinal bracket web clearing slot 93 in the otherwise screw-encompassing nut 27' so that the follower balls 88 will be in engagement with the screw to the maximum peripheral extent while making allowance for the bracket clearance slot, similarly as in all other forms of the invention, typically on the order of 290° for the ball follower arrangement, on the order of 280° for the stud follower arrangement, and 320° for the follower thread arrangement.

To enable travel of the ball followers 88 over the intermediate screw supporting brackets freely and smoothly, each bracket head 31 is complementary in diameter to the root diameter of the screw 25' so as to, in effect, provide an extension of the screw in the gap necessitated by the bracket head between the ends of the screw sections which may be coupled together within and through the head as by means of reduced diameter terminal journal portions 94 keyed or otherwise coupled together as for example by means of matching end keying piece 95. For transportation of the follower balls 88 thereacross, the bracket head has cylindrical surface 97 which is complementary to the root of the thread grooves 87 of the screw and the inner perimeter runs of the ball tracking orbit grooves 89 in the nut body 90. Thereby a smooth transitional running transfer of the follower ball groups from end-to-end of the adjacent screw sections across the bracket head is attained. Since the follower balls 88 follow closely one upon another and run in continuous orbits in the respective groups, extremely smooth, frictionless operation even at high speeds is an important attribute of this arrangement.

In some practical applications of the invention, it may be necessary for highly controlled operation to avoid as nearly as practicable any backlash play between the screw and nut in running operation. To this end, a pair of the nuts 27 may, as shown in FIG. 14, be operated in tandem with loading means therebetween to maintain the followers 38 in snug frictional engagement with the screw threads. Such loading means are indicated schematically at 98 and may comprise any suitable device such as jacking means, tie bolts, and the like, acting either to force the nuts apart, as indicated by the solid directional arrows or toward one another as indicated by the dashed directional arrows. Also schematically represented are nut guiding or tracking means indicated as rollers 99.

Under conditions of use where heavy thrust loads must be sustained by the screw 25, a load sharing thrust spring mounting of the screw sections in the hanger heads 31, substantially as shown in FIG. 15, may be utilized. To this end, a coupling stud 100 has respective opposite, threaded terminal end portions 101 and 102 respectively threadedly engaged in complementary threaded bores in the ends of the screw sections which are drawn up tight at one end against an integral collar 103 and at the opposite end against a collar washer 104. Means comprising respective pins 105 and 107 lock the screw sections and the stud 100 corotatively in proper alignment. Within the journal eye 34 of the head 31, the coupling stud 100 is journalled through the medium of anti-friction means comprising bearings 108. In addition, the eye bore 34 is counterbored at its opposite ends to receive between the collar 103 at one end and the collar washer 104 at the other end, and respective confronting thrust shoulders 109 provided on the bracket head by the counterbores, respective preloaded cupped washer springs 110. Friction reducing means such as thrust bearings 111 are interposed between the springs 110 and one of the shouldering means in each instance, herein the collars 103 and 104. To protect the preload and bearing mechanism, respective dust seal rings 112 are protectively mounted within the outer end portions of the counterbores and respectively the collar 103 and a cylindrical terminal bearing surface 113 on the screw section at the other end of the bracket head. Through this arrangement yieldable load in either axial direction is adapted to be absorbed by the respective springs 110 and the respective supporting brackets are in a load-sharing relationship. For example, where there are five brackets a 5,000 pound load may be shared at about 1,000 pounds at each bracket, but in any event will be distributed over the five brackets.

Figure 16:
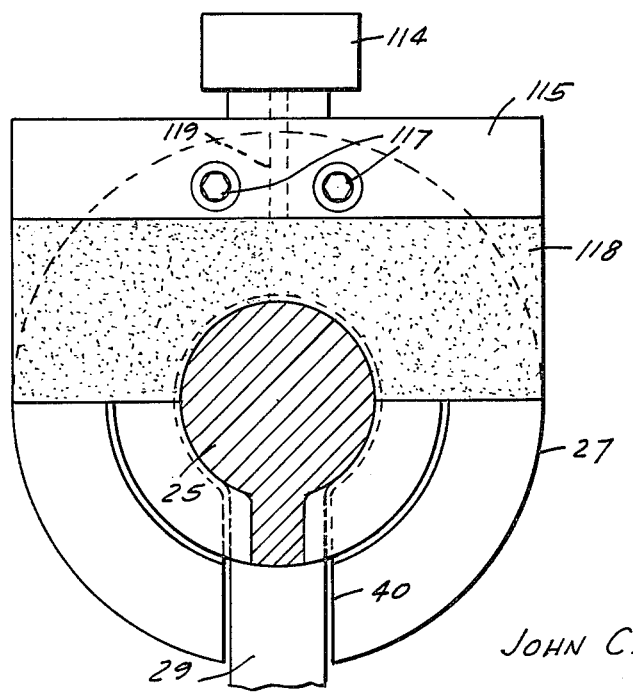
FIG. 16 is a transverse vertical sectional elevational view taken substantially along the line XVI—XVI of FIG. 15.

Lubricating means may be carried by the nut 27 (FIGS. 15 & 16) and conveniently may comprise an attachment on one or both ends of the nut body. For this purpose, a container 114 for lubricants such as oil is mounted on a carrying bracket bar 115 secured as by means of screws 117 to the end of the nut body. Lubricant applicator means in the form of a felt or equivalent applicator wick 118 attached to the bracket bar 115 receives lubricant from the container 114 through a lubricant duct 119 leading from the container 114 and wipingly engages within the thread grooves of the screw 25 to apply lubricant to the screw threads.

Representative of versatility in use of the long span screw and nut drive means of the present invention, aside from the more regular running of one or more nuts along a rotary screw which is fixed against any operating axial movement, is the schematically represented arrangement of FIG. 17 wherein the screw 25 is longitudinally shiftable in operation while one or more, in this instance two, nuts 27 are movable longitudinally along the screw. Means for driving the screw 25 may comprise a pulley 120 driven by endless driving means 120a such as flexible belts in a Reeves drive, and with the screw coupled with the pulley through a sliding spline connection 121. The sectional screw 25 is supported by intermediate brackets 28' which may be according to any preferred form such as those hereinbefore described, but mounted for movement with the axially movable screw, represented by anti-friction roller means 122, by way of example. Longitudinal movement guiding means represented by anti-friction rollers 123 are provided for the nuts 27 in this instance. Although both of the nuts 27 may be operated by the screw to run in the same direction, the arrangement may be, as shown, wherein the nuts are driven to run in opposite directions by having the screw threads pitched oppositely in different sections of the screw. Thus, with the shaft of the screw 25 rotating in the direction shown by directional solid arrows, the left hand nut will run leftward while the right hand nut will run rightward as shown by solid directional arrows, whereas when the screw rotation is reversed the left hand nut will run toward the right, and the right hand nut will run toward the left, as indicated by the dashed directional arrows. Any suitable device 124 may be on or connected with the respective nut 27 for motivating desired mechanism in the running of the respective nut.

Rapid axial traverse of the screw 25 with differential movement of a nut travelling therealong is attained with the arrangement of FIG. 18, wherein the screw 25 may be driven by the means 120 and runs through a stationary nut 27" so that the followers 38 cause the screw to move axially at a rate depending on the screw pitch plus rotary speed. At the same time the free running nut 27 is caused to advance in the respective direction directed by the rotating screw at a differential speed governed by the screw thread pitch and axial screw travel. In FIG. 19 is shown how differential travel of a plurality of nuts along the screw 25 can be attained by variable pitch in the threads of the respective screw sections along the length of the screw. In the illustrative example, the left hand nut 27 will travel at a slower speed than the right hand nut 27 at the same screw speed because the threads along which the left hand nut is travelling are of lower pitch than the threads along which the right hand nut is travelling.

As a further example of versatility, there is illustrated in FIG. 20 an arrangement whereby the nuts 27 can be run along an angular track 125 or at least a track in which there are one or more bends. Straight sections of the screw 25 extend from each end of the bend in the track with, if desired, a flexible shaft coupling 127 between the separated screw sections. A pair of the nuts 27 is connected by a bridging coupling 128 which is desirably pivotally attached at its opposite ends as a link between the nuts. By means of the coupling link 128 the nuts are spaced apart greater than the spacing between the separated screw sections so that at least one of the nuts is in driving relation to one of the screw sections at all times at either end of the bend in the track so that there is a constant running connection between the nut train and the screw 25 to maintain continuous driving relation of the nut train and the screw assembly. Any preferred running arrangement of the nuts along the track 125 may be employed, such as the roller means 52. To avoid any danger of binding of the nut train along the screw or in transferring between the angularly related screw sections the coupling link 128 is desirably of a preloaded flexible construction, being divided into separate sections connected by spring coupler means 129. For this purpose a shoulder flange 130 is rigid with one of the adjacent link ends and confronts a head shoulder flange 131 rigid with the other such link end. These shoulder flanges are connected in universal relatively movable relation including limited relative axial movement by preloaded spring means comprising a cupped spring washer 132 between the confronting spaced faces of the flanges and a cupped spring washer 133 between the flange 131 and a compressing and housing cap 134 threadedly drawn up on an annular marginal housing flange extension 135 on the flange 130 spaced about the perimeter of the flange 131. Overstressing of the springs 131 and 132 may be guarded against by means of spaced stop shoulders 137 and 138 on respectively the flange 130 and the cap 134 normally spacedly opposing the margin of the flange 131.

As a further device in smooth, uninterrupted and non-binding running of the nuts 27 or either of them onto the screw, the flat, tapered partial thread ends at the ends of the terminal screw sections are desirably removed as shown in the fragmentary enlargement within the balloon representation in FIG. 20 and it will be understood to apply to both of the terminal section ends shown. As illustrated, the removed end portion of thread is shown in dotted lines with the dotted follower representation showing how the follower might strike the partial flat end of the thread while the full line showing of the follower demonstrates how the follower moves directly into the helix of the groove without interruption. Preferably, the leading end of the thread is tapered slightly inwardly as shown. This feature will also be found valuable in other adaptations of the nut and screw assembly where it is desirable to run the nut off of and onto the end of the screw for any reason while the screw continues to rotate uninterruptedly. This feature is also desirable where as in FIG. 17 there is a reversal of the screw helix from section to section, or where as in FIG. 19 there is a difference in helix pitch from section to section.

It will be apparent that the arrangement of FIG. 20 lends itself to numerous practical adaptations wherein not only will the spaced link-coupled nuts be capable of linear, though angular running, but may also run along parallel or even non-parallel separate directions with the link 128 serving as a supporting medium in a conveyor or other apparatus. The nuts either jointly or individually may be switched from one track to another track. Numerous other permutations will readily suggest themselves.

It will be understood that variations and modifications may be effected without departing from the spirit and scope of the novel concepts of this invention.

I claim:

1. A long span screw and nut drive assembly, comprising:
   a screw having coaxial corotative screw sections with thread grooves of the sections operatively aligned, such sections being individually capable of withstanding load and torque stresses for an intended purpose;
   non-rotary supporting means between, and rotatably journalling, said screw sections;
   a nut non-rotatably coactive with said screw and having a body carrying follower means operatively engaging the screw threads in said grooves;
   said nut body being provided with a longitudinal slot to clear said supporting means in relative passing of the nut and the supporting means during relative axial movement of the screw and the nut requiring transfer of the nut from section-to-section; and
   means supporting and guiding said nut body to travel along said screw in stabilized spaced substantially concentric friction-free relation and limiting direct contact between the nut and the screw to useful work engagement between the followers and the screw threads.

2. An assembly according to claim 1, said nut supporting and guiding means comprising a roller guide assembly on at least one end of the nut body and riding on the crest of the screw threads and being of a length to bridge across the adjacent ends of the screw sections for continuity of motion transmission engagement of said follower means with the screw threads of the sections during said transfer.

3. An assembly according to claim 1, said non-rotary supporting means comprising a bracket having a base and a journal head with a narrower spacer web between said base and head, said head being of no greater diameter than said screw sections and said web being substantially narrower than the diameter of said screw sections, said nut slot being of a width which is only slightly greater than the width of said web, said nut supporting and guiding means including trolley outriggers fixed to and projecting laterally from the nut body and track means with which the outriggers have antifriction engagement.

4. An assembly according to claim 1, said nut supporting and guiding means including track means and a plurality of rollers carried by the nut body and running along the track means for maintaining the nut in non-rotary relation to the screw but permitting free axial movement of the nut along the screw.

5. An assembly according to claim 1, wherein said supporting and guiding means comprise trolley means on said nut body, rail means extending parallel to said screw, and rollers carried by said trolley means and running along said rail means.

6. An assembly according to claim 5, wherein said rail means have divergently gibway-like related track surfaces along which the rollers run.

7. An assembly according to claim 5, wherein said rail means are carried by said non-rotary supporting means and provide three track surfaces, said trolley means having three rollers running along said track surfaces.

8. An assembly according to claim 1, wherein said screw sections have coupling means maintaining constant lead alignment of the threads of the sections.

9. A long span screw and nut drive assembly, comprising:
   a screw having coaxial corotative screw sections with thread grooves of the sections operatively aligned, such sections being individually capable of withstanding load and torque stresses for an intended purpose;
   non-rotary supporting means between, and rotatably journalling, said screw sections;
   a nut non-rotatably coactive with said screw and having a body carrying follower means operatively engaging the screw threads in said grooves;
   said nut body being provided with a longitudinal slot to clear said supporting means in relative passing of the nut and the supporting means during relative axial movement of the screw and the nut requiring transfer of the nut from section-to-section;
   said supporting means comprising a bracket having a base and a journal head with a narrower spacer web between said base and head;
   said head being of no greater diameter than said screw sections and said web being substantially narrower than the diameter of said screw sections;
   said nut slot being of a width which is only slightly greater than the width of said web; and
   said bracket head having grooves therein through which said follower means are adapted to travel as the nut transfers from section-to-section.

10. A long span screw and nut drive assembly, comprising: a screw having coaxial corotative screw sections with thread grooves of the sections operatively aligned, such sections being individually capable of withstanding load and torque stresses for an intended purpose;
    non-rotary supporting means between, and rotatably journalling, said screw sections;
    a nut non-rotatably coactive with said screw and having a body carrying follower means operatively engaging the screw threads in said grooves;
    said nut body being provided with a longitudinal slot to clear said supporting means in relative passing of the nut and the supporting means during relative axial movement of the screw and the nut requiring transfer of the nut from section-to-section;
    said supporting means comprising a journal head between adjacent end portions of said screw sections,
    journal means in said head and corotatively coupling the screw sections;
    said journal means comprising respective journal extensions on the screw section end portions having interlocking means for corotational assembly; and
    connector means in the screw end portions maintaining the coupled relationship.

11. A long span screw and nut drive assembly, comprising:
    a screw having coaxial corotative screw sections with thread grooves of the sections operatively aligned, such sections being individually capable of withstanding load and torque stresses for an intended purpose;
    non-rotary supporting means between, and rotatably journalling, said screw sections;
    a nut non-rotatably coactive with said screw and having a body carrying follower means operatively engaging the screw threads in said grooves;
    said nut body being provided with a longitudinal slot to clear said supporting means in relative passing of the nut and the supporting means during relative axial movement of the screw and the nut requiring transfer of the nut from section-to-section; and
    said supporting means including a journal head comprising a separable cap enabling lateral removal of the screw sections when the cap is removed.

12. A long span screw and nut drive assembly, comprising:
    a screw having a plurality of coaxial corotative screw sections with thread grooves of the sections operatively aligned, such sections being individually capable of withstanding load and torque stresses for an intended purpose;

a plurality of respective non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section; and means cooperative with said sections and the supporting means providing for axial load sharing at the respective supporting means along the length of the screw.

13. An assembly according to claim 12, said supporting means in each instance comprising a journal head, and the load-sharing means comprising preloaded cupped spring washer means under yieldable compression between spaced confronting shoulders on respectively the journal heads and the screw sections.

14. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section; and said follower means comprising follower studs projecting radially from an inner perimeter of the nut into the screw threads.

15. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

said thread grooves being provided by square threads on the sections;

said follower means of the nut comprising complementary square threads interfitting with the screw section threads; and means providing anti-friction dynamic fluid cushion between the screw threads and the nut threads.

16. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

said follower means comprising anti-friction ball trains; and a plurality of individual orbital raceways in the nut for said ball trains and having arcuate ball return surfaces adjacent to said slot.

17. An assembly according to claim 16, in which said nut comprises a body having said raceways, and a jacket about said body cooperating with the body in closing a run of said raceways.

18. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section; and means carried by the nut for applying lubrication in said thread grooves.

19. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

track means comprising a bar for maintaining the nut in non-rotary relation to the screw but permitting free axial movement of the nut along the screw; and said nut having a track groove within which the bar is received.

20. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

fixedly mounted track means for maintaining the nut in non-rotary relation to the screw but permitting free axial movement of the nut along the screw; and said nut having anti-friction roller means riding along the track means.

21. A long span screw and nut drive assembly, comprising:
a screw having coaxial corotative screw sections with thread grooves of the sections operatively aligned, such sections being individually capable of withstanding load and torque stresses for an intended purpose;

non-rotary supporting means between, and rotatably journalling, said screw sections;

a pair of nuts non-rotatably coactive with said screw and each having a body carrying follower means operatively engaging the screw threads in said grooves;

said nut bodies being provided with respective longitudinal slots to clear said supporting means in relative passing of the nuts and the supporting means during relative axial movement of the screw and the nuts requiring transfer of the nuts from section-to-section; and means connecting the nuts and applying a relative axial load therebetween to substantially eliminate axial play between the nut followers and the screw sections in said thread grooves.

22. A long span screw and nut drive assembly, comprising:

a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

means for driving said screw rotatably and enabling axial move-ment of the screw;

said supporting means being axially movable with the screw; and said nut being axially movable along the screw responsive to motion transmission coaction between said follower means and said screw sections within said thread grooves.

23. An assembly according to claim 22, including a fixed nut operatively engaging said screw and effecting longitudinal movement of the screw as the screw is driven rotatably.

24. A long span screw and nut drive assembly, comprising:

a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

a plurality of separate ones of the nuts each having followers operatively engaging in the thread grooves of the sections and each having a slot to pass said supporting means;

said thread grooves of different ones of the sections being reverse in operation so that as the screw rotates in one direction, the nuts are driven to move axially therealong in opposite longitudinal directions.

25. A long span screw and nut drive assembly, comprising:

a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

including a plurality of similar nuts mounted in running relation along the screw;

said thread grooves of the respective sections being of different pitch to effect differential axial travel of the nuts along the screw in the rotation of the screw.

26. A long span screw and nut drive assembly, comprising:

a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

track means for guiding the nut axially along the screw;

said track means having an angular bend therein with portions of the screw separated by the length of said bend; and means for effecting continuous travel transition of the nut across the space between the screw portions.

27. An assembly according to claim 26, in which said last-mentioned means comprise a second similar nut; means connecting the nuts together in spaced relation greater than the spacing between said screw portions, and means for coordinating rotation of said screw portions.

28. A long span screw and nut drive assembly, comprising:

a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section;

primary driving means for the screw; and booster driving means associated with said supporting means.

29. A long span screw and nut drive assembly, comprising:

a screw having coaxial corotative screw sections with thread grooves of the sections operatively aligned, such sections being individually capable of withstanding load and torque stresses for an intended purpose;

non-rotary supporting means between, and rotatably journalling, said screw sections;

a nut non-rotatably coactive with said screw and having a body carrying follower means operatively engaging the screw threads in said grooves;

said nut body being provided with a longitudinal slot to clear said supporting means in relative passing of the nut and the supporting means during relative axial movement of the screw and the nut requiring transfer of the nut from section-to-section; and an end on one of the screw sections having at least one thread ending at such end, said thread end being free from partial thread so that the follower means will pass directly into a thread groove without interference.

* * * * *